(12) United States Patent
Singh et al.

(10) Patent No.: US 10,650,290 B2
(45) Date of Patent: May 12, 2020

(54) SKETCH COMPLETION USING MACHINE LEARNING

(71) Applicant: Adobe Inc., San Jose, CA (US)

(72) Inventors: Piyush Singh, Noida (IN); Vikas Kumar, New Delhi (IN); Sourabh Gupta, Noida (IN); Nandan Jha, Noida (IN); Nishchey Arya, Ghaziabad (IN); Rachit Gupta, New Delhi (IN)

(73) Assignee: Adobe Inc., San Jose, CA (US)

( * ) Notice: Subject to any disclaimer, the term of this patent is extended or adjusted under 35 U.S.C. 154(b) by 157 days.

(21) Appl. No.: 15/997,526

(22) Filed: Jun. 4, 2018

(65) Prior Publication Data

US 2019/0370617 A1    Dec. 5, 2019

(51) Int. Cl.
*G06K 9/62*    (2006.01)
*G06K 9/66*    (2006.01)
*G06T 11/80*    (2006.01)
*G06N 20/00*    (2019.01)

(52) U.S. Cl.
CPC .............. *G06K 9/66* (2013.01); *G06N 20/00* (2019.01); *G06T 11/80* (2013.01); *G06T 2200/24* (2013.01)

(58) Field of Classification Search
CPC ....... B41B 27/00; G06F 3/153; G06F 3/0489; G09G 5/39; G06K 9/66
USPC ................................ 382/159, 119, 203, 233
See application file for complete search history.

(56) References Cited

U.S. PATENT DOCUMENTS

| | | | | |
|---|---|---|---|---|
| 9,275,684 | B2 * | 3/2016 | Amento | G11B 27/034 |
| 9,552,391 | B1 * | 1/2017 | Taylor | G06F 16/29 |
| 10,325,407 | B2 * | 6/2019 | Lanier | G06T 19/006 |
| 2016/0357367 | A1 * | 12/2016 | Foster | G06F 3/0482 |

\* cited by examiner

*Primary Examiner* — Charlotte M Baker
(74) *Attorney, Agent, or Firm* — SBMC

(57) ABSTRACT

Sketch completion using machine learning in a digital medium environment is described. Initially, a user sketches a digital image, e.g., using a stylus in a digital sketch application. A model trained using machine learning is leveraged to identify and describe visual characteristics of the user sketch. The visual characteristics describing the user sketch are compared to clusters of data generated by the model and that describe visual characteristics of a set of digital sketch images. Based on the comparison, digital sketch images having visual characteristics similar to the user sketch are identified from similar clusters. The similar images are returned for presentation as selectable suggestions for sketch completion of the sketched object.

20 Claims, 8 Drawing Sheets

SKETCH COMPLETION USING MACHINE LEARNING

BACKGROUND

Content creation systems continue to make advances in computing technologies that assist client device users with creating digital content in ways largely limited to professional content creators in the past. As one example, these systems enable client device users to generate professional quality digital images even though these users have little to no experience or knowledge of rules for composing visually pleasing images. In addition to having little experience or knowledge for composing visually pleasing images, many client device users also lack the ability to provide certain types of input for creating visually pleasing images. By way of example, many client device users are incapable of sketching (e.g., using a stylus on a display screen) in a way that produces sketches with high-quality or that accurately convey a desired concept. In scenarios where client device user are capable of making high-quality sketches and sketches that accurately convey a desired concept, doing so can take a great deal of time for these users. Accordingly, conventional systems may not be suitable for supporting sketches as input and/or may not encourage creating digital visual content based on sketches.

SUMMARY

To overcome these problems, sketch completion using machine learning is leveraged in a digital medium environment. Initially, a sketch completion system receives an input digital sketch (e.g., stylus input to sketch an object) via a user interface. The sketch completion system leverages a trained machine learning model to identify and describe visual characteristics of the input digital sketch. The input digital sketch is input to the trained machine learning model and output data is received describing the visual characteristics of the input digital sketch.

To generate the output the data, the machine learning model is trained, using a training set of digital sketch images, to identify and describe visual characteristics of digital sketches. After training the machine learning model, the sketch completion system provides a set of digital sketch images as input to the trained machine learning model and receives output data describing the set of digital sketch images. To enable the output data to be searched for identification of similar sketches, the output data is clustered to generate data clusters. Each data cluster includes output data describing a group of similar digital sketch images from the set of digital sketch images.

Returning to the input digital sketch, the sketch completion system leverages the data clusters to identify digital sketch images for sketch completion of the input digital sketch. To identify these digital sketches, the output data describing the visual characteristics of the input digital sketch is compared to the clusters of output data. Based on the comparison, the sketch completion system determines clusters of the output data that are similar to the output data of the input digital sketch. Digital sketch images associated with the similar clusters are identified for sketch completion of the input digital sketch. The sketch completion system outputs the identified digital sketch image for selection via the user interface. In response to receiving a selection of one of the identified digital sketch images, the sketch completion system completes the input digital sketch by replacing the input digital sketch presented in the user interface with the selected digital sketch image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
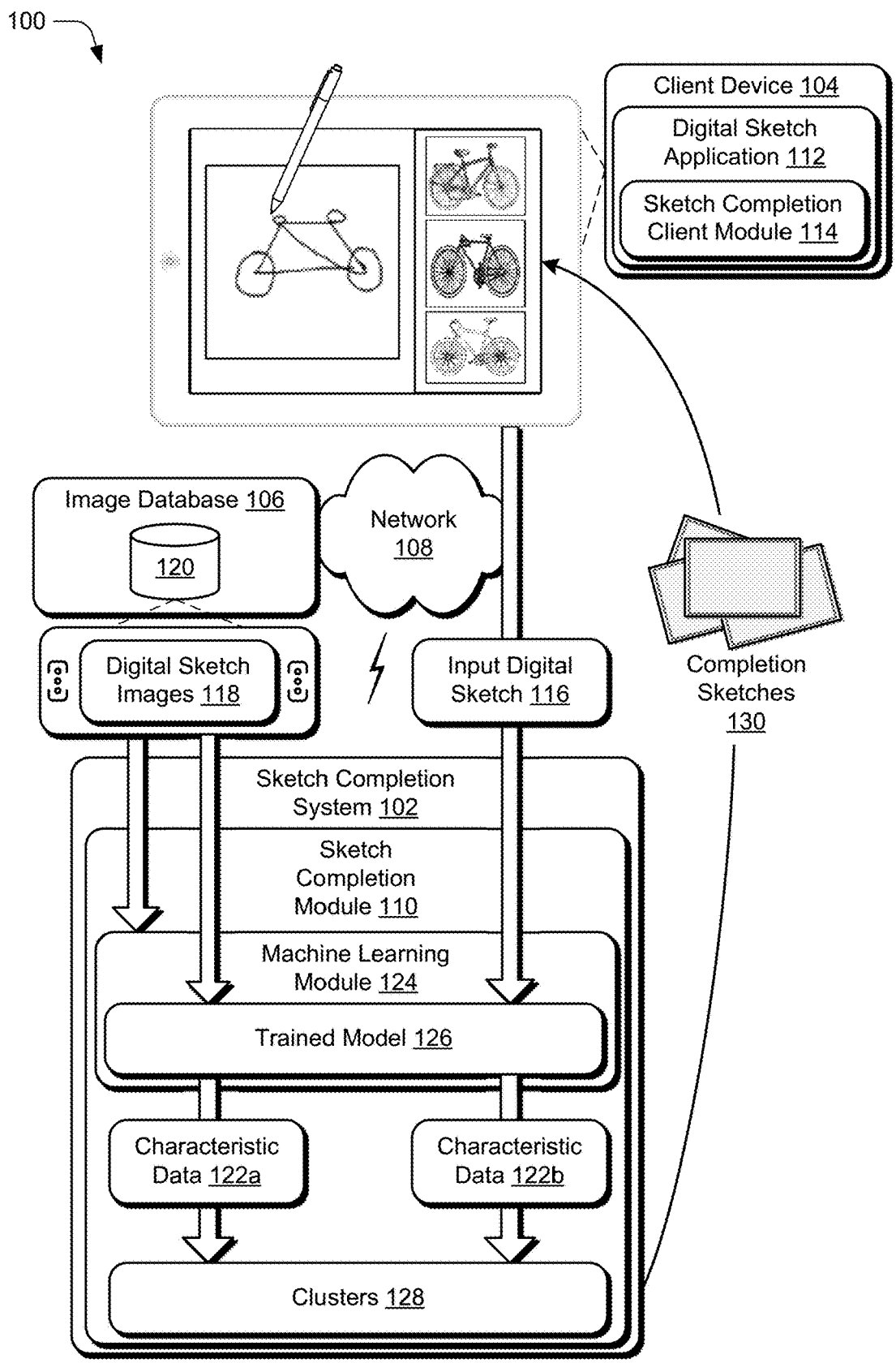
FIG. 1 is an illustration of an environment in an example implementation that is operable to employ techniques for sketch completion using machine learning as described herein.

Client device users attempting to produce a professional quality digital sketch (e.g., with a stylus and via a user interface) may spend a great deal of time doing so using conventional systems. Additionally, a vast amount of high-quality artistic content is available to users in the form of digital sketches, but users are unlikely to know about the entirety of this content. Conventional systems for searching digital sketch content match text-based queries to tags that are associated with the sketch content. However, these systems may not be able to interpret concepts—conveyed visually through sketches—from the words of these text-based queries. Consequently, users that search for digital sketches using such conventional systems may not be shown images that match characteristics desired by the user. Consequently, conventional image searching systems may inhibit the creation of high-quality digital sketches.

To overcome these problems, sketch completion using machine learning is leveraged in a digital medium environment. In one or more implementations, a sketch completion system receives an input digital sketch. By way of example, a client device user sketches an object with a stylus by touching a tip of the stylus to a display device for one or more strokes and while a digital sketch application is executed. The sketch completion system provides this input digital sketch as input to a machine learning model, which outputs data (e.g., feature vectors) describing visual characteristics of the input digital sketch. In one or more implementations, the input digital sketch is provided to the sketch completion system upon occurrence of an event such as the user lifting the tip of the stylus from the display device. In other implementation, the input digital sketch is provided to the sketch completion system upon explicit request by the user, e.g., via a selectable command from the digital sketch application.

The machine learning model is trained, using a training set of digital sketch images, to identify and describe visual characteristics of digital sketch images, e.g., using feature vectors. In one or more implementations, the trained model is a convolutional neural network that is trained to identify and describe the visual characteristics. Broadly speaking, the trained model recognizes visual characteristics of digital sketches that are difficult to express using text or that deviate from conventional systems for classifying digital sketches.

After training the machine learning model, the sketch completion system provides a set of digital sketch images as input to the trained machine learning model and receives output data from the machine learning model describing the set of digital sketch images. This output data is clustered to generate data clusters such that each cluster includes output data describing a group of similar digital sketch images from the set of digital sketch images. In some implementations, the clusters are generated using a K-means clustering technique.

Returning now to the discussion of the data output by the machine learning model to describe the input digital sketch in accordance with one or more techniques. The sketch completion system compares the input digital sketch's data (e.g., a feature vector) to the clusters of data (e.g., clustered feature vectors), such that each cluster includes data describing a group of similar digital sketch images from a large set of different training sketch images. The sketch completion system leverages the data clusters to identify digital sketch images for sketch completion of the input digital sketch. The sketch completion system compares the output data describing the visual characteristics of the input digital sketch to the clusters of output data.

Based on the comparison of the input digital sketch's data to the clusters, the image completion system determines the clusters which include similar data (e.g., feature vectors) to the input digital sketch's data. Given this determination, the sketch completion system identifies digital sketches associated with the clusters having similar data. This enables the sketch completion system to identify digital sketches for completing an input digital sketch using data output from a trained model.

The sketch completion system outputs the identified digital sketches for selection. In one or more implementations, the identified digital sketches are displayed via a user interface at the digital sketch application in conjunction with the input digital sketch. By way of example, the identified digital sketches are displayed next to the object sketched as the input digital sketch. In addition or alternately, location data (e.g., a Uniform Resource Locator ("URL") link) is output by the sketch completion system and the identified digital sketches are retrieved using the location data. In response to receiving a selection of one of the identified digital sketch images (e.g., via the user interface), the sketch completion system completes the input digital sketch by replacing the input digital sketch presented in the user interface with the selected digital sketch image. This enables a user to complete a high-quality digital sketch without spending a great deal of time doing so. Instead, users may draw a simple sketch of an object and receive digital sketches selectable for sketch completion of the drawn object.

Furthermore, the described techniques may also enable users to specify an object for sketch completion using sketch input rather than searching a database of digital sketch images using a text-based query. Instead of requiring users to describe a desired sketch in text-based parameters, the described techniques allow users to sketch a desired object and receive selectable sketch images for sketch completion of the sketched object.

Consider an example scenario in which a user manually draws a crude outline of the Eiffel Tower with a stylus via a user interface of a tablet device. In response to the user lifting the stylus from the tablet device for two seconds, the input digital sketch representing the Eiffel Tower is provided to the sketch completion system. Three professional quality sketches of the Eiffel tower are received from the sketch completion system in response such that a user may select one of the sketches for sketch completion of the crude outline of the Eiffel Tower. Each of the three returned Eiffel Tower sketches, for instance, includes detailed shading and high-quality artistic representations of the Eiffel tower as sketched by a professional content creator. The returned Eiffel Tower sketches are displayed via the user interface for selection. In response to receiving a selection of the first suggested Eiffel tower sketch, the selected high-quality digital sketch of the Eiffel Tower replaces the crude outline of the Eiffel Tower at the user interface. Consequently, the user is able complete a high-quality digital sketch of the Eiffel Tower without committing a great deal of time to drawing and without requiring a great level of artistic talent or training.

Term Descriptions

As used herein, the term "sketch" refers, generally, to an item depicted in digital form in a hand-drawn manner, rather than in a manner in which the item is captured, e.g., by a camera. However, a sketch may refer to a variety of different digital image forms without departing from the spirit or scope of the techniques described herein.

As used herein, the term "object" refers, generally, to an item depicted in a digital sketch. The term "structure" may refer to one or more composite features of an object. By way of example, a bicycle may be considered an example of an object in a digital sketch. Structure, however, may correspond to a bicycle being depicted as a composite of two parallel circles connected by a frame depicted as a bisected rhombus. However, an object may refer to a variety of different items without departing from the spirit or scope of the techniques described herein. Likewise, structure may refer to a variety of features including locations and orientations of features without departing from the spirit or scope of the techniques described herein.

As used herein, the term "visual characteristic" refers, generally, to a discrete feature of a sketch. By way of example, a visual characteristic may include visually identifiable aspects of a sketch, e.g., spatial, structural, geometric properties of the sketch. As another example, a visual characteristic may include temporal characteristics of a digital sketch, e.g., an order in which each sketch stroke in a composite sketch is received. However, visual characteristic may refer to a variety of different items without departing from the spirit or scope of the techniques described herein.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for sketch completion using machine learning as described herein. The illustrated environment 100 includes a sketch completion system 102, client device 104, and image database 106 that are communicatively coupled, one to another, via a network 108.

Computing devices that are usable to implement the sketch completion system 102, client device 104, and image database 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 7.

The sketch completion system 102 is illustrated as including a sketch completion module 110 that is representative of functionality to provide services via the network 108 that are usable to complete digital sketch input. The sketch completion module 110, for instance, may train a model to identify and describe visual characteristics of digital sketches. In addition, the sketch completion module 110, for instance, may receive a digital sketch input from the client device and identify sketch images for sketch completion of the digital sketch input. The sketch completion module 110 may expose content or functionality that is accessible via the network 108 by a digital sketch application 112 of the client device 104.

In general, the digital sketch application 112 represents functionality to receive digital sketch input in connection with the digital sketch application 112. In accordance with one or more implementations, the digital sketch application 112 is capable of receiving input as a user sketch, e.g., a sketch made by a user with a stylus, mouse, or touch input on a displayed drawing canvas. The digital sketch application 112 may be configured as a digital sketch application, a network-enabled application, and so on, that obtains data from the sketch completion system 102 via the network 108. This data can be employed by the digital sketch application 112 to enable a user of the client device 104 to communicate with the sketch completion system 102, such as to auto complete digital sketches when the sketch completion system 102 provides suggested images.

To enable sketch completion, the client device 104 includes a sketch completion client module 114. In general, the sketch completion client module 114 represents functionality to present data representative of images selected for sketch completion of an input digital sketch 116, e.g., data comprising and/or identifying the predicted sketch images from an image collection such as the image database 106, and so forth. The sketch completion client module 114 is also configured to initiate communication of the input digital sketch 116 to the sketch completion system 102. Although functionality of the sketch completion client module 114 is illustrated as separate from the sketch completion system 102 and/or sketch completion module 110, this functionality may also be incorporated as part of the sketch completion system 102, further divided among other entities, and so forth. In other words, the sketch completion client module 114 is capable of the same or similar functionality at the client device 104 as the sketch completion module 110.

The input digital sketch 116 represents sketch input captured at the client device 104, e.g., sketch input drawn by a user with a stylus. The digital sketch application 112 may also be configured to receive the input digital sketch 116 in other ways as described in more detail below.

In the illustrated example, the sketch completion system 102 is depicted receiving the input digital sketch 116. To search for similar digital sketches, the sketch completion system 102 may leverage the image database 106. Although functionality of the image database 106 is illustrated as separate from the sketch completion system 102, this functionality may also be incorporated as part of the sketch completion system 102, further divided among other entities, and so forth. The image database 106 includes digital sketch images 118, which are illustrated in storage 120. In any case, the digital sketch images 118 may represent digital content configured as sketches maintained by the image database 106. For example, these images can include digital representations of artistic works users have uploaded to the image database 106 for sharing, those indexed by the image database 106 in connection with crawling the web, and so forth. The sketch completion module 110, for instance, may output a selected set of the digital sketch images 118 via the network 108 to the client device 104 for sketch completion of the input digital sketch 116.

In order to control which items of the digital sketch images 118 are to be output to the client device 104 in this example, the sketch completion module 110 is depicted receiving the digital sketch images 118 and the input digital sketch 116. The digital sketch images 118 and the input digital sketch 116 are associated with characteristic data 122 describing visual characteristics of the respective digital sketch. The characteristic data 122 represents output of a trained model and describes at least one visual characteristic of a respective input digital sketch.

Each of the digital sketch images 118 in the image database 106 is associated with characteristic data 122a (e.g., one or more feature vectors) which describes visual characteristics of the respective sketch image. The characteristic data 122b, on the other hand, describes visual characteristics of the input digital sketch 116. Whether in reference to the characteristic data 122a or the characteristic data 122b, the described visual characteristics are determined by a machine learning module 124 employed by the sketch completion system 102 to identify the visual characteristics from digital sketches.

In this example environment 100, the sketch completion system 102 includes the machine learning module 124 and the sketch completion module 110. The machine learning module 124 is implemented at least partially in hardware of a computing device, in part, to deploy machine learning techniques to identify and describe visual characteristics of sketched digital images, e.g., the characteristic data 122 generated for the digital sketch images 118 and/or the input digital sketch 116. The machine learning module 124 is also configured to train a machine learning model to produce a trained model 126.

In implementations, the trained model 126 is a convolutional neural network or other type of machine-learning model that is trained for digital image feature extraction, and can learn the image features of the digital sketch images 118. Generally, a convolutional neural network is a type of machine-learning model implemented as a computing algorithm for self-learning with multiple layers that run logistic regression on data to learn features and train parameters of the network. According to some implementations, the self-learning aspect is also referred to as unsupervised feature learning because the input is unknown to the convolutional neural network, in that the neural network is not explicitly trained to recognize or classify the image features, but rather trains and learns the image features from the input, such as the digital sketch images 118 in the image database 106. While in other implementations, the convolutional neural network is pre-trained to perform an operation using digital images, but is re-trained according to the embodiments described below. For example, the convolutional neural network is pre-trained to classify images by category and output data indicative of the category, e.g., a text-based tag. In the example, one or more layers of the pre-trained network are re-trained for digital image feature extraction, as described in further detail below. In some implementations, the machine learning module 124 employs machine learning techniques to extract features from the input digital sketch 116.

However, scenarios exist in practice in which the digital sketch images 118 include hundreds, thousands, and even millions of the characteristic data 122a, which may lead to increased latency and resource consumption when searching and/or comparing the characteristic data 122a. To address this, the sketch completion module 110 generates clusters 128 of the characteristic data 122a, e.g., using K-means clustering, Silhouette model, and so forth. The sketch completion module 110 is thus configured to cluster the characteristic data 122a (and the corresponding digital sketch images 118) into a reduced number of the clusters 128 that are underpinning groups of related image features based on similarity of the characteristic data 122a, one to another. In this way, the high latency of conventional systems for searching a large number of digital images is avoided. Yet still, the clusters 128 may be used to retain information usable for processing by the sketch completion system 102 for identifying items from the digital sketch images 118 for sketch completion of the input digital sketch 116.

In order to control which items of the digital sketch images 118 are to be output to the client device 104 for sketch completion of the input digital sketch 116 in this example, the sketch completion module 110 employs an algorithm configured to identify completion sketches 130 based on similarity criterion. For example, one or more of the clusters 128 are determined to have the closest Euclidian distance to visual features describing the input digital sketch 116. The determined one or more of the clusters 128 are utilized in the example to identify the completion sketches 130 having the most visual characteristics to the input digital sketch 116. Generally, the sketch completion module 110 can compare visual characteristics describing the input digital sketch 116 to each of the respective clusters 128. The similarity of the clusters 128 to the input digital sketch 116 may be utilized to identify items of the digital sketch images 118 to communicate to the client device 104 as the completion sketches 130 based on the similarity criterion.

The completion sketches 130 may be communicated to the client device 104 for presentation as sketch completion suggestions. In some implementations, the completion sketches 130 are returned as the items of the digital sketch images 118 (or visual representations thereof) determined to be the most similar to the input digital sketch 116. In other implementations, the completion sketches 130 are communicated to the client device 104 as data (e.g., links) for accessing the corresponding digital sketch images 118 via the network 108.

Having considered an example environment, consider now a discussion of some example details of the techniques for sketch completion using machine learning in a digital medium environment in accordance with one or more implementations.

Sketch Completion

Figure 2A:
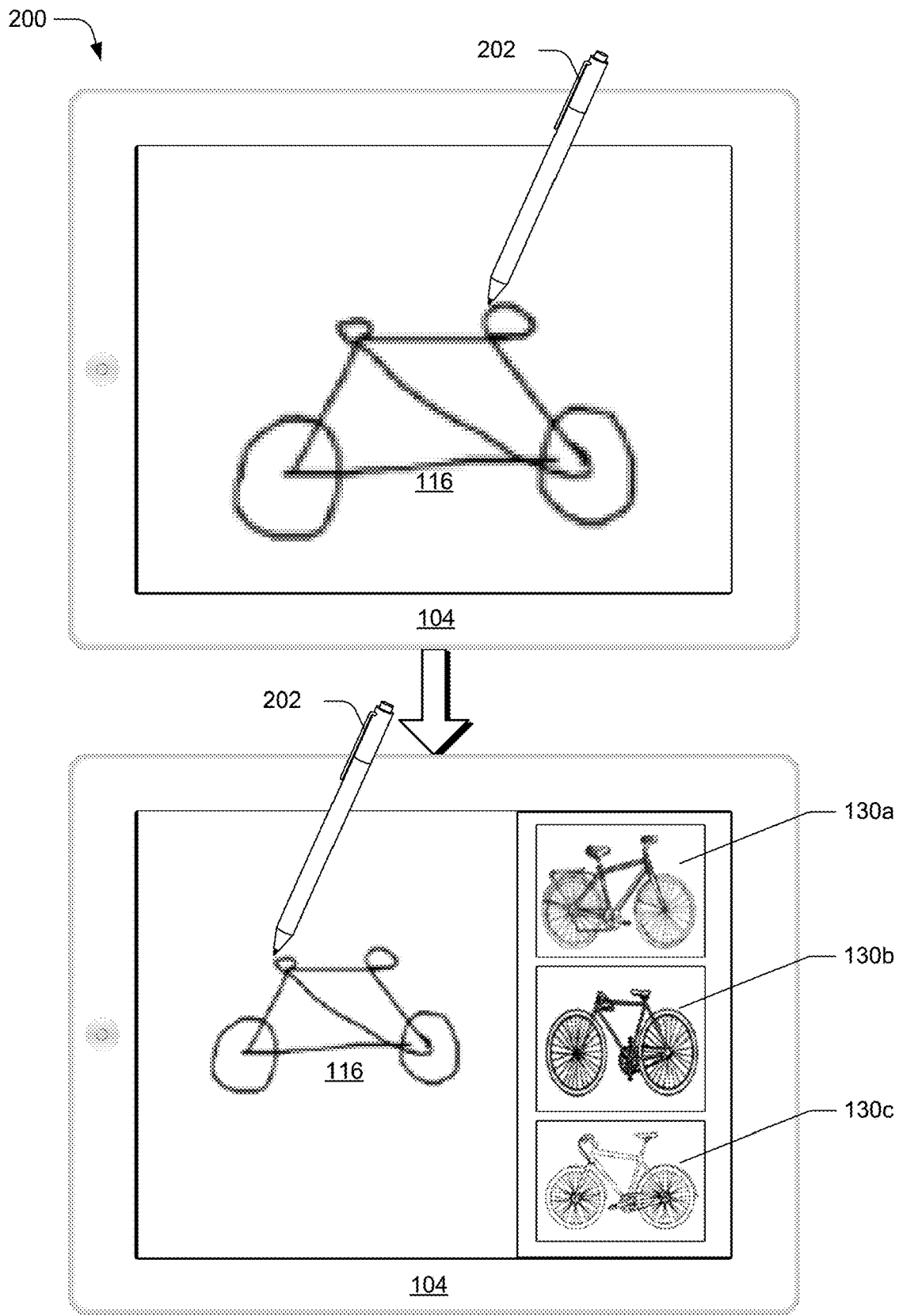
FIG. 2A depicts an example of an input digital sketch and returned sketch images for sketch completion of the input digital sketch.

FIG. 2A depicts an example 200 of an input digital sketch and returned completion sketch images for sketch completion of the input digital sketch. The illustrated example 200 includes the client device 104 of FIG. 1. The client device 104 is depicted displaying the input digital sketch 116, which a user of the client device 104 may sketch with stylus 202. It should be appreciated that a user of the client device 104 may provide input to draw the input digital sketch 116 in ways other than with the stylus 202 without departing from the spirit or scope of the techniques described herein. By way of example, a user of the client device 104 may provide input for the input digital sketch 116 using a mouse, using a finger to provide touch input, and so on.

In any case, the input digital sketch 116 is configured to represent a drawing input. The sketch completion client module 114 is configured to communicate the input digital sketch 116 to the sketch completion system 102, as shown in FIG. 1, and receive the completion sketches 130. Consider the illustrated example 200 in accordance with one or more embodiments. In this example, a user of the client device 104 has sketched a bicycle in the input digital sketch 116. This can indicate that the user would like to obtain sketch images of a bicycle. Clearly, a user may sketch a variety of different objects (e.g., buildings, clouds, people, animals, etc.) that serve as a basis for the features compared to determine the completion sketches 130 for sketch completion of the input digital sketch 116.

In addition to the input digital sketch 116, the client device 104 is depicted displaying the completion sketches 130 (depicted as completion sketches 130a, 130b, and 130c), which are selectable for sketch completion of the input digital sketch 116. In the illustrated example 200, the completion sketches 130a, 130b, and 130c are digital sketches generally depicting a bicycle. It should be appreciated that the completion sketches 130 may have a variety of different styles without departing from the spirit or scope of the techniques described herein. The completion sketches 130 may also originate from a variety of different sources (e.g., previous artwork obtained from other users, social networking services, digital artwork repositories, and so on) without departing from the spirit or scope of the described techniques. It should further be appreciated that while three of the completion sketches 130 are shown in FIG. 2, the completion sketches 130 may include one or more images based on settings of the sketch completion system 102 and/or the digital sketch application 112.

Moreover, a user interface displayed in connection with providing input for the input digital sketch 116 may not initially display the completion sketches 130, as illustrated. Rather, the user interface may enable a user of the client device 104 to select a menu option that causes the completion sketches 130 to be presented. Alternately or in addition, the sketch completion client module 114 and/or the digital sketch application 112 may support functionality to automatically present the completion sketches 130 in connection with receiving the input digital sketch 116. In one implementation, the sketch completion client module 114 causes presentation of the completion sketches 130 in response to a "pen up" action detected. For instance, the pen up action may indicate that the user has completed sketching an abject. In some implementations, a threshold of time elapses in order for a triggering event to be detected by the digital sketch application 112 and/or the sketch completion client module 114, e.g., the pen up action occurs without a pen down action occurring for two seconds. Regardless of how the completion sketches 130 are presented, the completion sketches 130 provide suggestions for sketch completion of the input digital sketch 116.

It should be appreciated that the digital sketch application 112 may display user interfaces configured in a variety of different ways to enable sketch input and sketch completion suggestion. These user interfaces may enable users to provide sketch inputs in a variety of different ways without departing from the spirit or scope of the techniques described herein. The user interfaces may also enable users to select different suggested images for sketch completion of sketch input in a variety of different ways without departing from the spirit or scope of the techniques described herein. In this context, consider FIG. 2B.

Figure 2B:
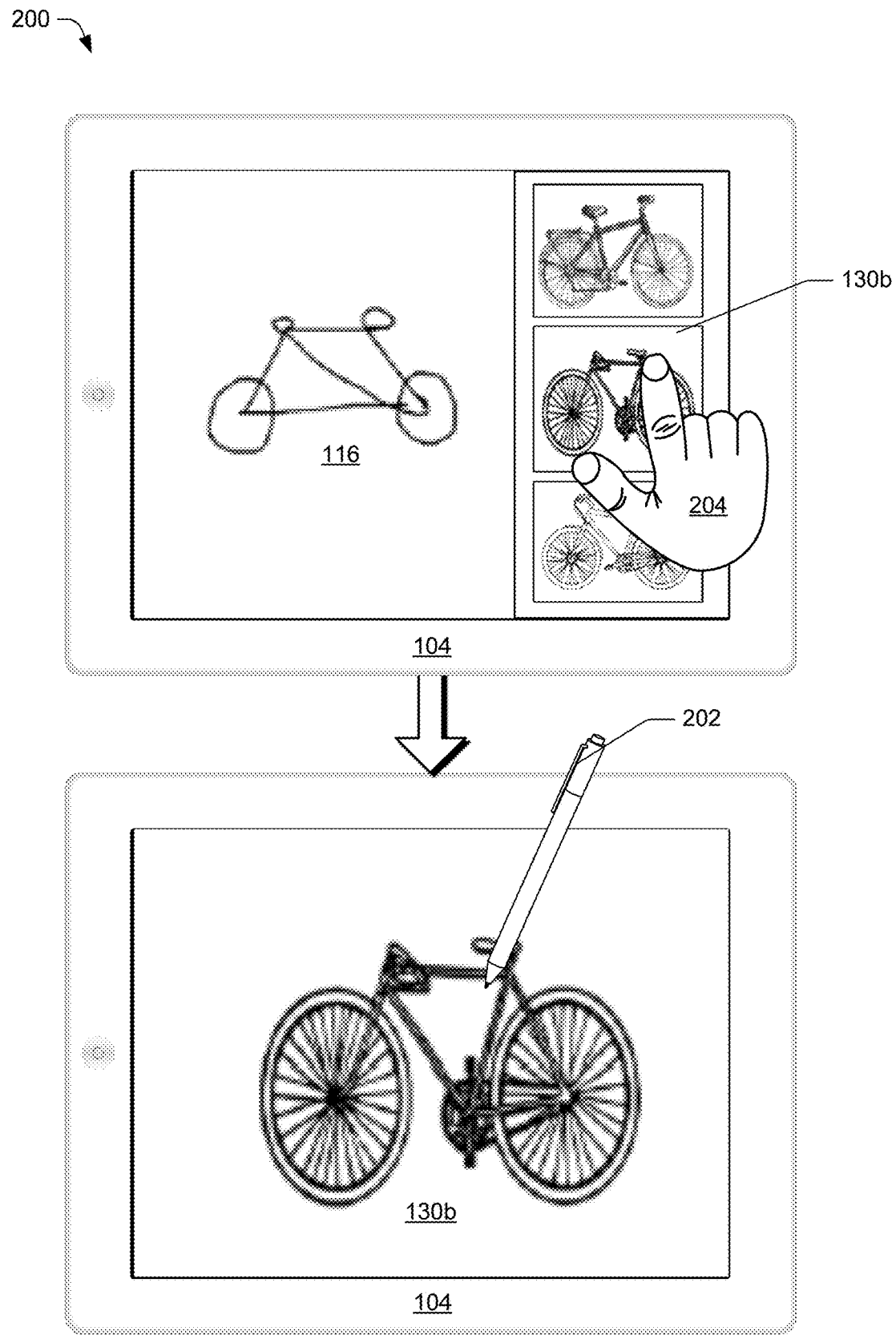
FIG. 2B depicts a continuation of the example of the input digital sketch and returned sketch images for sketch completion of the input digital sketch.

FIG. 2B depicts a continuation of the example 200 of sketch completion of the input digital sketch. The client device 104 is depicted in the upper portion of the example 200 displaying the input digital sketch 116 and the completion sketches 130 from FIG. 2A. The completion sketches 130 are selectable for sketch completion of the input digital sketch 116.

In the scenario depicted, the user selects the completion sketch 130b (e.g., the middle of the three completion sketches 130a-c depicting bicycles) suggested for sketch completion of the input digital sketch 116. As shown, the second of the completion sketches 130 is selected via an input 204. For instance, the input 204 is a touch input using a finger, the stylus 202, input device, and so forth. In response to receiving the input 204, the sketch completion client module 114 replaces the input digital sketch 116 with the selected second completion sketch 130b via the user interface of the client device 104.

Regardless of the user interface components that enable a user to select sketch images for sketch completion, the sketch completion system 102 provides the completion sketches 130 to predict sketch completion of the input digital sketch 116. In this context, consider FIG. 3.

Figure 3:
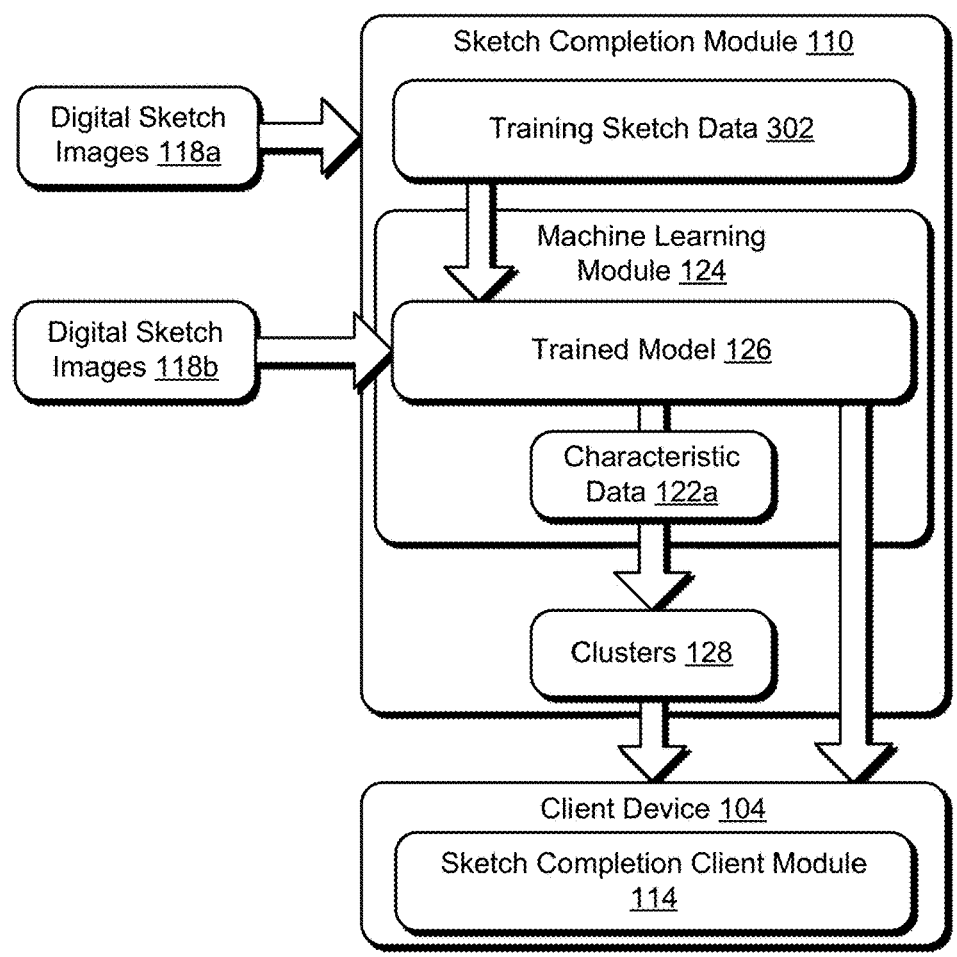
FIG. 3 depicts an example implementation of a training system that trains a model for identifying sketch images for sketch completion.

FIG. 3 depicts a system 300 in an example implementation in which the sketch completion system 102 of FIG. 1 generates a model trained to identify and describe visual characteristics of digital sketch images. The illustrated system 300 is depicted with the sketch completion module 110 and the machine learning module 124 of the sketch completion system 102 of FIG. 1.

In this example, the sketch completion module 110 is depicted obtaining the digital sketch images 118a, e.g., from the image database 106 of FIG. 1. The digital sketch images 118a and 118b each represent a set of the digital sketch images 118. In some implementations, the digital sketch images 118a and/or the digital sketch images 118b represent all of the digital sketch images 118, whereas in other implementations one or both of the digital sketch images 118a and 118b represent a subset of the digital sketch images 118. The digital sketch images 118a are input to the sketch completion module 110 to generate training sketch data 302. The training sketch data 302 represents a training set of the digital sketch images 118.

In some implementations, the sketch completion module 110 applies pre-processing techniques to digital sketches to generate normalized or variant image data. For example, the digital sketch images 118a are pre-processed by the sketch completion module 110 to generate variant parameters and features in the training sketch data 302. For instance, the training sketch data 302 may vary in parameters such as orientation, perspective, and so forth. Thus, training the model with images that include varying degrees of perspective and/or orientation parameters increases the accuracy of the model. In some implementations, the training sketch data 302 is generated by varying an orientation of the digital images. For instance, the sketch completion module 110 horizontally flips a portion of the digital sketch images 118a and randomly rotates a portion of the digital sketch images 118a within a specified range of degrees. In this way, the training sketch data 302 may account for varying orientation parameters of the input digital sketch 116. While specific parameters are described herein, it should be understood that the sketch completion module 110 is configured to apply pre-processing techniques to the digital sketch images 118a other than the examples described above.

The training sketch data 302 is input to the machine learning module 124 to generate the trained model 126 using machine learning. The machine learning module 124 may, for instance, train the trained model 126 using the training sketch data 302 on an image by image basis. The trained model 126 leverages machine learning techniques to learn composite features of the training sketch data 302. In one or more implementations, the trained model 126 is a convolutional neural network that is trained to recognize sketch features in digital sketches such as the training sketch data 302. In one or more implementations, the trained model 126 learns to extract various composite characteristics of a digital sketch. For instance, the machine learning module 124 may configure the trained model 126 to extract characteristics from digital sketches related to geometric makeup, structural makeup, temporal order of stroke input, relative spacing of features, relative size and shape of features, and so forth. Broadly speaking, the trained model recognizes visual characteristics of digital sketches that are difficult to express using text, e.g., tags and/or other metadata.

After the trained model 126 is trained using the training sketch data 302, the digital sketch images 118b are processed by the trained model 126 to extract the characteristic data 122a from the digital sketch images 118b. In one or more implementations, the training sketch data 302 represents a subset of the digital sketch images 118. It should be understood, though, that the training sketch data 302 can comprise a set of digital sketches not included in the digital sketch images 118b. Thus, the digital sketch images 118a from which the training sketch data 302 is generated are not necessarily the same or a superset of the digital sketch images 118b that are processed by the trained model 126 to extract the characteristic data 122a.

By analyzing features of the training sketch data 302 (e.g., at various levels of abstraction or depth within levels of a convoluted neural network), the trained model 126 is configured to extract the characteristic data 122a from the digital sketch images 118b. Each digital sketch included in the digital sketch images 118b is input through the trained model 126 which generates output of one or more of the characteristic data 122a associated with each digital sketch.

Thus, the trained model 126 produces data indicating the characteristic data 122 extracted from each of the digital sketch images 118 that are received as input. Once trained, the trained model 126 may then be used in this instance to transform sketch inputs into feature vector representations. As a result, the trained model 126 may be pre-trained to extract the characteristic data 122b from the input digital sketch 116.

The characteristic data 122a generated by the trained model 126 are input to the sketch completion module 110 to generate the clusters 128. The sketch completion module 110 may, for instance, cluster the characteristic data 122a into a number of the clusters 128 that is smaller than the number of the characteristic data 122a based on a similarity of the characteristic data 122a, one to another. This clustering may be performed in a variety of ways, e.g., a K-means clustering, Silhouette model, Hierarchical clustering, Fuzzy clustering, and so forth.

The sketch completion module 110 is thus configured to leverage the digital sketch images 118 and the characteristic data 122a to generate suggestions for sketch completion of digital sketches received as input. The sketch completion module 110 and/or the trained model 126 and the clusters 128 represent a trained sketch completion prediction system configured to receive a digital sketch as input and generate data indicative of the completion sketches 130 as output for sketch completion of the received digital sketch. In one or more implementations, the trained sketch completion prediction system, e.g., the sketch completion module 110, the sketch completion client module 114, and/or the trained model 126 and the clusters 128, is an embeddable module capable of operating across numerous systems and/or devices as the sketch completion prediction system. For instance, the trained model 126 and the clusters 128 may be embedded as a resource available to the sketch completion client module 114 of the client device 104. In other words, once the trained model 126 and the clusters 128 are generated, the sketch completion module 110 and/or the sketch completion client module 114 represent a pre-trained sketch completion prediction system for predicting sketch completion of digital sketches. In this way, the sketch completion module 110 may be employed as a scalable resource, e.g., over the network 108, capable of utilization by numerous instances of the trained sketch completion prediction system and/or client devices. In this context, consider FIG. 4.

Figure 4:
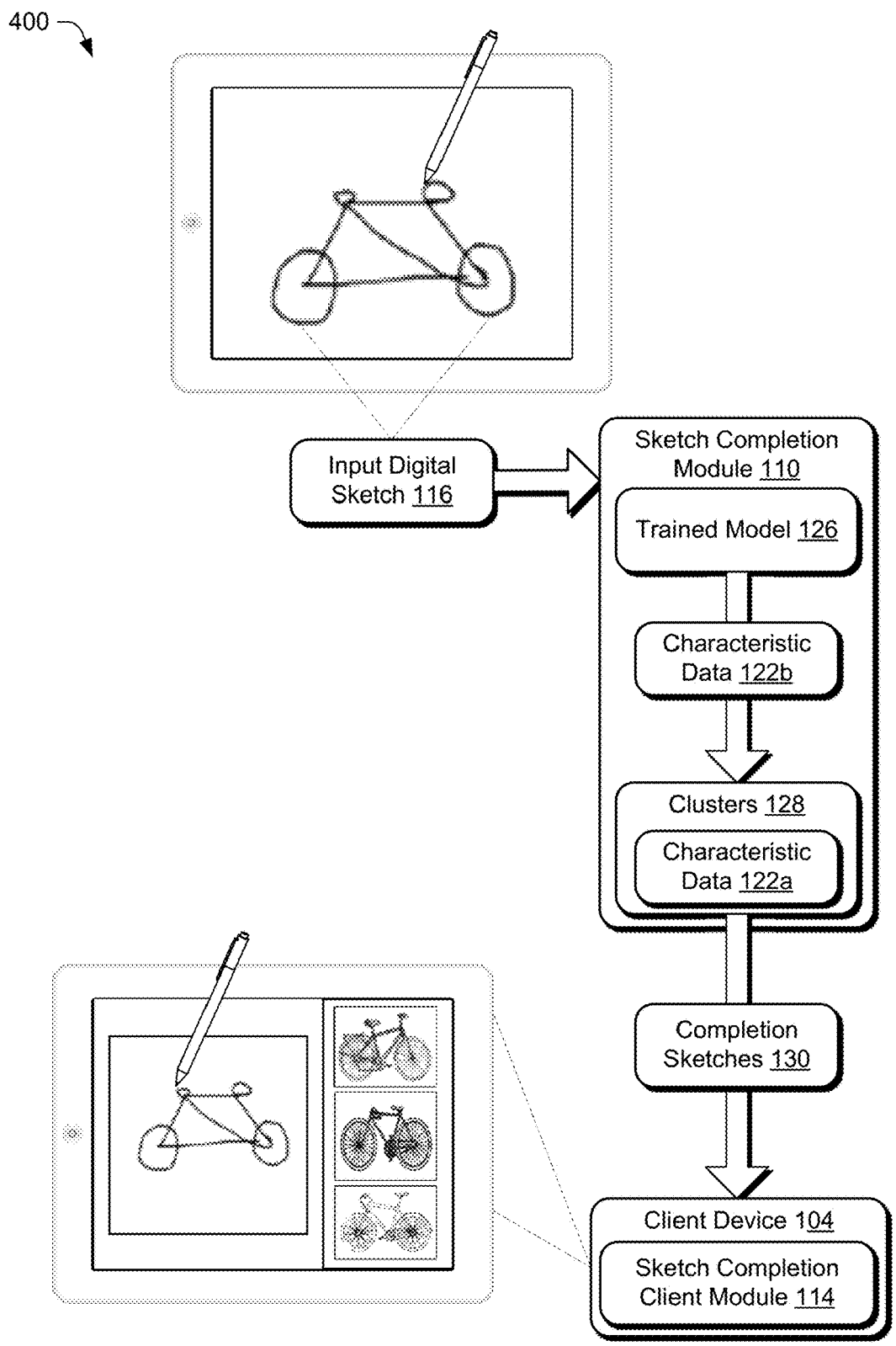
FIG. 4 depicts an example implementation of a sketch completion system that uses a model trained using machine learning to identify and retrieve images for sketch completion of an input digital sketch.

FIG. 4 depicts a system 400 in an example implementation in which the sketch completion system 102 of FIG. 1 uses the trained model 126 and the clusters 128 as described in relation to FIG. 3 to identify and retrieve images for sketch completion of an input digital sketch. In this example, the input digital sketch 116 is received, e.g., from the client device 104.

The input digital sketch 116 is received by the sketch completion module 110, e.g., in response to a pen up event at the client device 104. For example, a user sketches an object on a user interface of the client device 104 using the stylus 202, as described in relation to FIG. 2 above. The input digital sketch 116, configured in this example as a simple sketch of a bicycle, is communicated for receipt by the sketch completion system 102. The sketch completion module 110 applies pre-processing techniques to the input digital sketch 116 to prepare the input digital sketch 116 for input to the trained model 126. In some implementations, pre-processing the sketch input is leveraged to improve the accuracy of feature extraction by the machine learning module 124. A variety of parameters of the input digital sketch 116 may be adjusted to prepare the sketch data for processing by the trained model 126. The parameters may include attributes related to orientation, background color, contrast, size, aspect ratio, and so forth. For instance, the sketch completion module 110 resizes the input digital sketch 116 to a predefined size and sets the background color of the input digital sketch 116 to white.

The input digital sketch 116 is then processed by the trained model 126 and a result of the processing is characteristic data 122b for the input digital sketch 116. The characteristic data 122b represent feature vectors (as in the characteristic data 122b) for the input digital sketch 116. In one or more implementations, the trained model 126 is a convolutional neural network configured to recognize and extract composite features and/or structures of the input digital sketch 116 as the characteristic data 122b. The characteristic data 122b may be leveraged in a variety of ways, such as to control output of the completion sketches 130 by the sketch completion system 102 to the client device 104 associated with a user. For instance, the completion sketches 130 are provided to the client device 104 as one or more suggestions for sketch completion of the input digital sketch 116.

Continuing the example, the sketch completion module 110 leverages the clusters 128 and to generate the completion sketches 130 based on similarity to the characteristic data 122b extracted from the input digital sketch 116. Accordingly, the sketch completion module 110 is configured to predict the digital sketches (e.g., the completion sketches 130) for sketch completion of the input digital sketch 116 by comparing the characteristic data 122b to the clusters 128, and the characteristic data 122a represented therein. To predict the completion sketches 130, the sketch completion module 110 determines a degree or value of similarity between the clusters 128 and the characteristic data 122b. In some implementations, the characteristic data 122b are compared to the clusters 128 to find one or more nearest k-means neighbors, e.g., based on Euclidean distance. The characteristic data 122a of the digital sketch images 118 associated with the determined nearest of the clusters 128 are used to identify image data (e.g., data identifying the digital sketch images 118 corresponding to the determined nearest of the clusters 128) for the completion sketches 130.

The completion sketches 130 are returned to the client device 104 to be presented as suggested sketches for sketch completion of the input digital sketch 116 as described in relation to FIG. 2. In one example of use of the completion sketches 130, a user may sketch a simple outline of a cloud via an application at the client device 104, e.g., by providing the input digital sketch 116 via the stylus 202. After removing the stylus 202 for a predetermined amount of time (a "pen up" action), the user is presented with the completion sketches 130, each configured as a professional quality digital sketch of a cloud, predicted for sketch completion of the input digital sketch 116. If one of the completion sketches 130 is of interest to the user for sketch completion, the user selects the desired one of the completion sketches 130 via a display at the client device 104. As a result of selecting the image, the selected image of a cloud replaces the input digital sketch 116 at the display of the client device 104. The presentation of the completion sketches 130 thus saves the user time and effort by enabling sketch completion of the user's sketch with a pre-drawn digital image.

Figure 5:
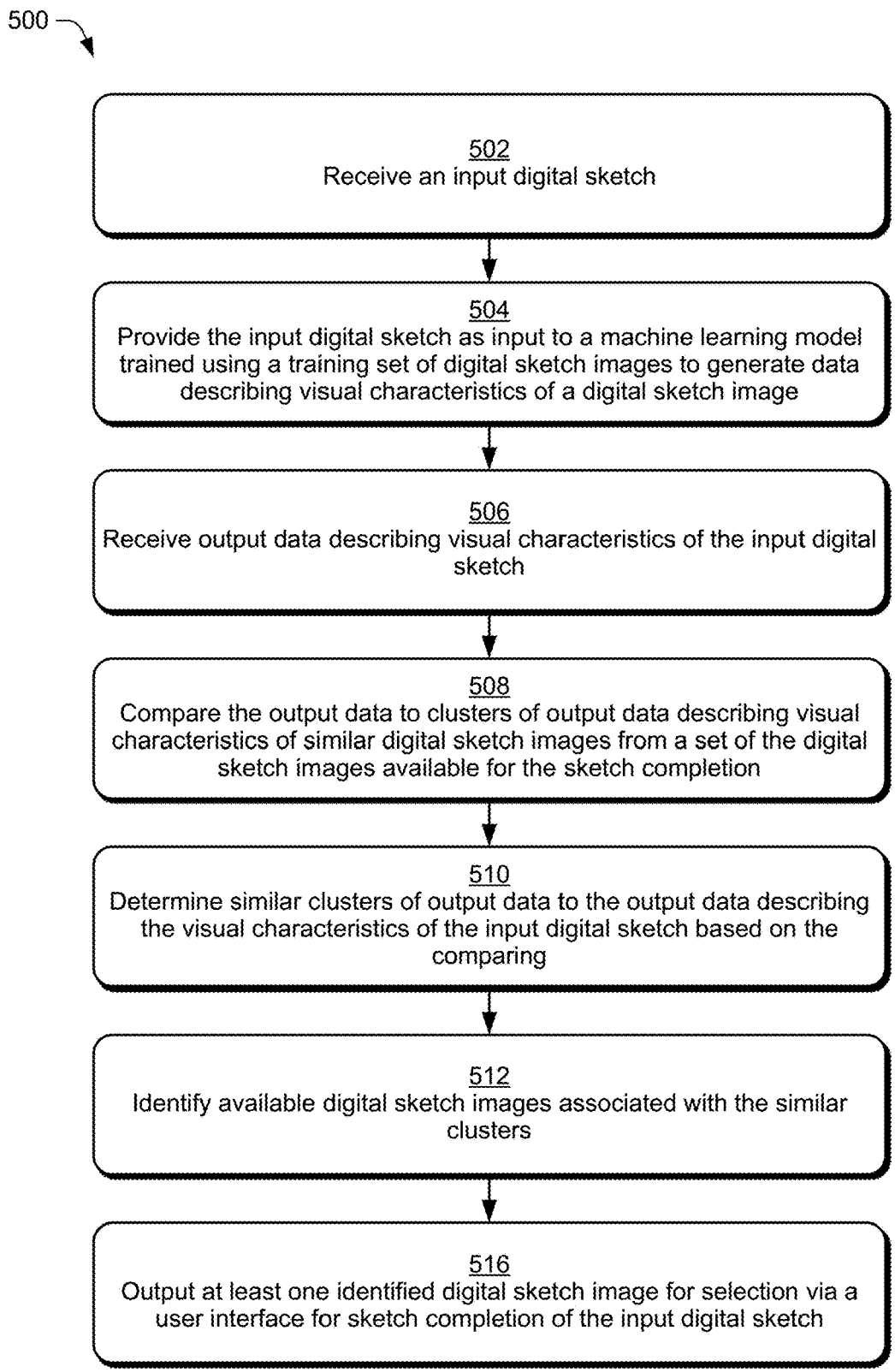
FIG. 5 depicts a procedure in an example implementation in which a model trained using machine learning is utilized for sketch completion of an input digital sketch.

FIG. 5 depicts an example procedure 500 in which a model trained using machine learning is utilized for sketch completion of an input digital sketch.

An input digital sketch is received (block 502). By way of example, the client device 104 receives input via the stylus 202 to generate the input digital sketch 116. Continuing the example, the sketch completion client module 114 communicates the input digital sketch 116 to the sketch completion system 102 to request the completion sketches 130 for sketch completion of the input digital sketch 116. The input digital sketch is provided as input to a machine learning model trained using a training set of digital sketch images to generate data describing visual characteristics of a digital sketch image (block 504). For instance, the input digital sketch 116 is received by the sketch completion module 110 and input to the trained model 126. By way of example, the sketch completion module 110 generates the training sketch data 302 from the digital sketch images 118a received from the image database 106 via the network 108. Continuing the example, the training sketch data 302 is used to train the trained model 126 by the machine learning module 124. Once trained, the trained model 126 is configured to identify and describe visual characteristics from digital sketches. Output data describing visual characteristics of the input digital sketch is received (block 506). For instance, the trained model 126, already trained to identify and describe visual characteristics of digital sketches using the training sketch data 302, generates the characteristic data 122b and returns the characteristic data 122b as output to the sketch completion module 110. In a scenario in which the trained model 126 is embedded at an application executed by the client device, the characteristic data 122b is returned to the sketch completion client module 114.

The output data is compared to clusters of output data describing visual characteristics of similar digital sketch images from a set of the digital sketch images available for the sketch completion (block 508). For example, the sketch completion module 110 clusters the characteristic data 122a into the clusters 128 based on similarity of the characteristic data 122a, one to another. Similar clusters of output data to the output data describing the visual characteristics of the input digital sketch are determined based on the comparing (block 510). Continuing the example, the sketch completion module 110 compares the characteristic data 122b to the clusters 128 to determine one or more of the clusters 128 having the characteristic data 122a which is similar to the characteristic data 122b.

Available digital sketch images associated with the similar clusters are identified (block 512). In the scenario where one or more of the digital sketch images 118 are identified, the identified one or more of the digital sketch images 118 are identified as the completion sketches 130. For example, the sketch completion module 110 identifies digital sketch images 118 associated with the clusters 128 determined as similar to the characteristic data 122b. In the scenario in which the trained model 126 and/or the clusters 128 are embedded at an application executed by the client device 104, data identifying the completion sketches 130 is returned by the sketch completion prediction system in response to receiving the input digital sketch 116. At least one identified digital sketch image is output for selection via a user interface for sketch completion of the input digital sketch (block 514). For instance, a URL address corresponding to one or more of the completion sketches 130 is communicated to the client device 104. In the scenario where the URL address is communicated to the client device 104, one or more of the completion sketches 130 are rendered at the client device 104 for display via the digital sketch application 112 in a user interface. The display of the completion sketches 130, in this scenario, allows a user to select one of the completion sketches 130 for sketch completion of the input digital sketch 116. In another instance, the completion sketches 130 are communicated to the client device 104 for presentation to the user as suggested sketch images for sketch completion of the input digital sketch 116.

Figure 6:
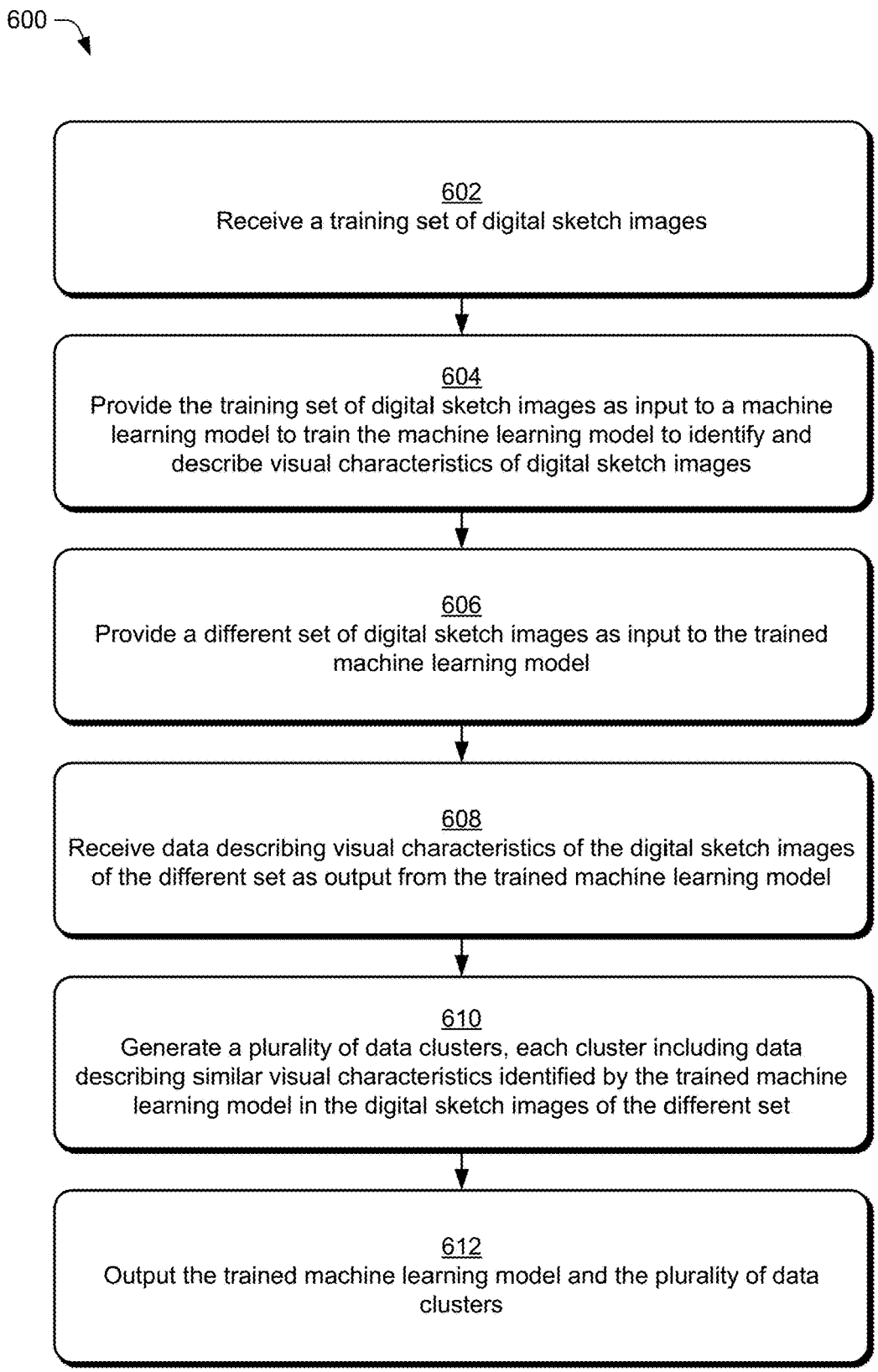
FIG. 6 depicts a procedure in an example implementation in which a machine learning model is trained using a training set of digital sketch images to identify and describe visual characteristics of digital sketch images.

FIG. 6 depicts an example procedure 600 in which a machine learning model is trained using a training set of digital sketch images to identify and describe visual characteristics of digital sketch images. A training set of digital sketch images is received (block 602). For instance, the digital sketch images 118, or a subset thereof (e.g., the digital sketch images 118a), are received by the sketch completion system 102 from the image database 106 via the network 108. The training set of digital sketch images is provided as input to a machine learning model to train the machine learning model to identify and describe visual characteristics of digital sketch images (block 604). By way of example, the machine learning module 124 provides the training sketch data 302 to a convolutional neural network to generate the trained model 126. A different set of digital sketch images is provided as input to the trained machine learning model (block 606). Data describing visual characteristics of the digital sketch images of the different set is received as output from the trained machine learning model (block 608). In a scenario where the trained model 126 is trained using the training sketch data 302, the trained model 126 is configured to receive the digital sketch images 118b as input and generate the characteristic data 122a describing visual characteristics of the digital sketch images 118b as output.

A plurality of data clusters are generated, each cluster including data describing similar visual characteristics identified by the trained machine learning model in the digital sketch images of the different set (block 610). For example, the sketch completion module 110 clusters the characteristic data 122a into the clusters 128 based on similarity of the characteristic data 122a, one to another. In a scenario where the characteristic data 122a are clustered based on similarity, the sketch completion module 110 may utilize a K-means clustering technique. The trained machine learning model and the plurality of data clusters are output (block 612). In the scenario where the sketch completion module 110 utilizes the trained model 126 to generate the characteristic data 122a, the trained model 126 and the clusters 128 represent the sketch completion prediction system configured for sketch completion of the input digital sketch 116. By way of example, the trained model 126 and the clusters 128 are output by the sketch completion system 102 and embedded as a part of the sketch completion client module 114 at the client device 104 as the sketch completion prediction system.

Having described example procedures in accordance with one or more implementations, consider now an example system and device that can be utilized to implement the various techniques described herein.

Example System and Device

Figure 7:
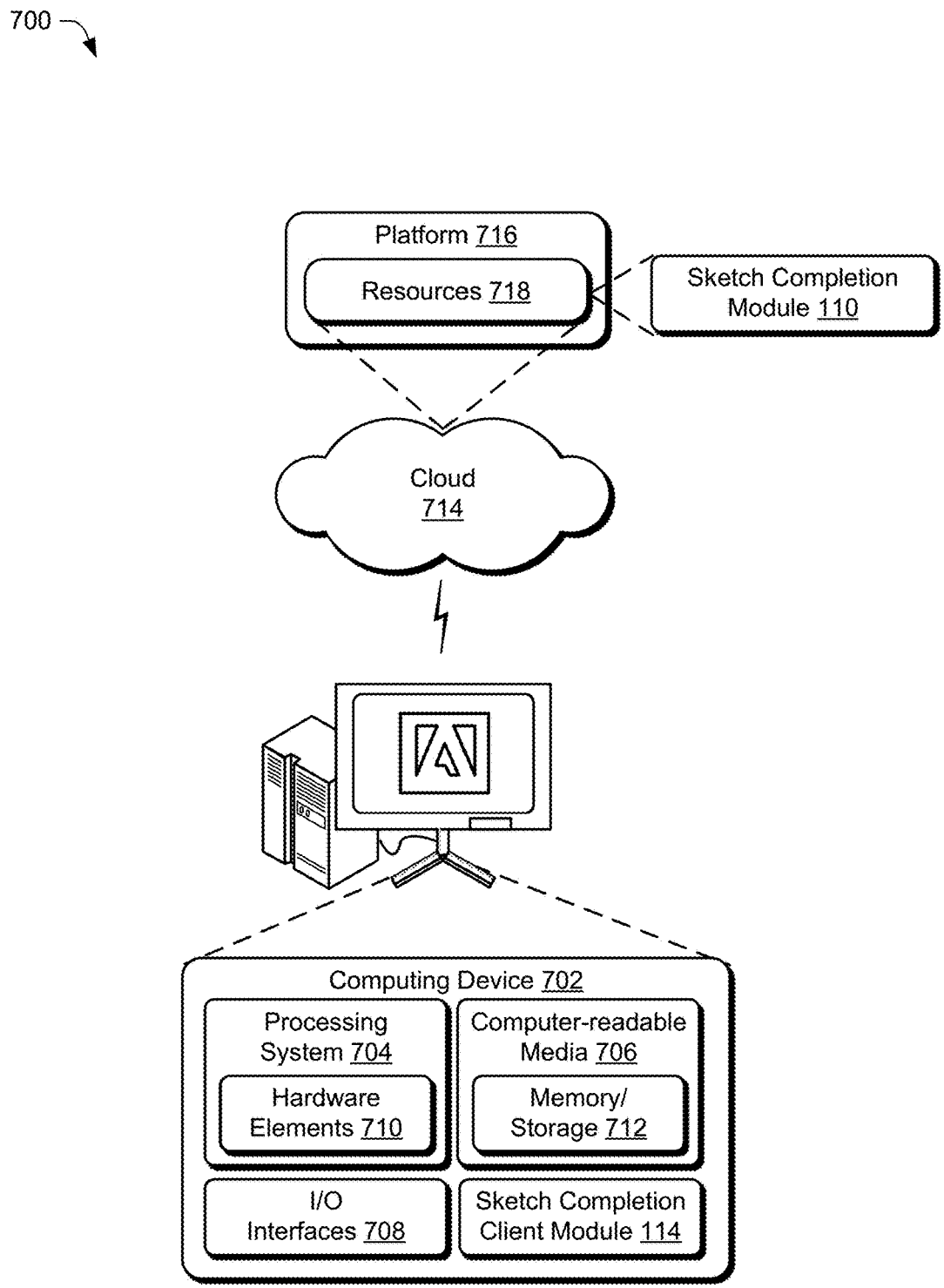
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the sketch completion client module 114. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. This is illustrated through inclusion of the sketch completion module 110. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to identify digital sketch images for sketch completion of an input digital sketch, a method implemented by at least one computing device, the method comprising:
   receiving, by the at least one computing device, the input digital sketch;
   providing, by the at least one computing device, the input digital sketch as input to a sketch completion prediction system configured to compare data describing visual characteristics of the input digital sketch to data describing visual characteristics of a set of digital sketch images available for sketch completion;
   receiving, by the at least one computing device, output data identifying available digital sketch images associated with data describing similar visual characteristics to the input digital sketch; and
   outputting, by the at least one computing device, at least one identified digital sketch image for selection via a user interface for sketch completion of the input digital sketch.

2. The method as described in claim 1, wherein the input digital sketch is a digital sketch representing an object.

3. The method as described in claim 1, wherein the providing the input digital sketch includes resizing the input digital sketch to a predetermined size.

4. The method as described in claim 1, wherein the providing the input digital sketch includes adjusting a background color for the input digital sketch.

5. The method as described in claim 1, wherein the outputting includes causing presentation of the at least one identified digital sketch image via the user interface to enable selection of the at least one identified digital sketch image for completion of the input digital sketch.

6. The method as described in claim 1, wherein the outputting includes displaying the at least one identified digital sketch image via the user interface, the method further comprising:
   receiving, by the at least one computing device, a selection of the at least one identified digital sketch image; and
   causing display of the selected digital sketch image via the user interface in place of the input digital sketch.

7. The method as described in claim 1, wherein the outputting includes outputting a location for retrieving the at least one identified digital sketch image from an image database and the method further comprises retrieving the at least one identified digital sketch image from the location.

8. The method as described in claim 1, wherein the sketch completion prediction system includes a machine learning model comprising a convolutional neural network trained using a set of digital sketch images to generate data describing visual characteristics of a digital sketch image.

9. The method as described in claim 1, wherein the sketch completion prediction system includes clusters of data describing visual characteristics of similar digital sketch images from the set of digital sketch images.

10. The method as described in claim 1, wherein the method is performed by a digital sketch application of the at least one computing device configured to receive the input digital sketch and wherein the sketch completion prediction system is embedded as part of the digital sketch application.

11. A system comprising:
    at least one processor; and
    memory having stored thereon computer-readable instructions that are executable by the at least one processor to perform operations for sketch completion of an input digital sketch using a model trained using machine learning, the operations including:
      receiving the input digital sketch;
      providing the input digital sketch as input to a machine learning model trained using a training set of digital sketch images to generate data describing visual characteristics of a digital sketch image;
      receiving output data describing visual characteristics of the input digital sketch;
      identifying available digital sketch images associated with data describing similar visual characteristics to the output data; and
      outputting at least one identified digital sketch image for selection via a user interface for sketch completion of the input digital sketch.

12. A system as described in claim 11, the operations further including:
    displaying the at least one identified digital sketch image via the user interface;
    receiving a selection of the at least one identified digital sketch image; and displaying the selected digital sketch image via the user interface in place of the input digital sketch.

13. A system as described in claim 11, wherein the input digital sketch is a digital sketch representing an object.

14. A system as described in claim 13, wherein the at least one identified digital sketch image is a digital sketch representing the object.

15. A system as described in claim 11, wherein the machine learning model comprises a convolutional neural network.

16. In a digital medium environment to train a machine learning model used for identifying digital sketch images for sketch completion of an input digital sketch, a method implemented by a computing device, the method comprising:
   receiving, by the computing device, a training set of digital sketch images;
   providing, by the computing device, the training set of digital sketch images as input to a machine learning model to train the machine learning model to identify and describe visual characteristics of digital sketch images;
   providing, by the computing device, a different set of digital sketch images as input to the trained machine learning model;
   receiving, by the computing device, data describing visual characteristics of the digital sketch images of the different set as output from the trained machine learning model;
   generating, by the computing device, a plurality of data clusters, each cluster including data describing similar visual characteristics identified by the trained machine learning model in the digital sketch images of the different set; and
   outputting, by the computing device, the trained machine learning model and the plurality of data clusters.

17. The method as described in claim 16, wherein the training is performed using a convolutional neural network.

18. The method as described in claim 17, wherein the convolutional neural network is pre-trained for classifying images by outputting one or more tags, and wherein said training the model includes retraining one or more layers of the convolutional neural network to identify and describe the visual characteristics of the digital sketch images.

19. The method as described in claim 16, wherein said outputting comprises embedding the trained model, by the computing device, as part of a sketch completion prediction system configured to receive the input digital sketch and output one or more digital sketch images for sketch completion of the input digital sketch.

20. The method as described in claim 16, wherein the providing the training set of digital sketch images includes one or more of:
   horizontally or vertically flipping one or more of the digital sketch images from the training set; and
   rotating one or more of the digital sketch images from the training set by a random number of degrees within a predefined range of degrees of rotation.

\* \* \* \* \*